(12) United States Patent
Courington et al.

(10) Patent No.: US 11,178,552 B2
(45) Date of Patent: Nov. 16, 2021

(54) SYSTEM AND METHOD FOR CREATING AND MANAGING PRIVATE SUBNETWORKS OF LTE BASE STATIONS

(71) Applicant: John Mezzalingua Associates, LLC, Liverpool, NY (US)

(72) Inventors: Jeffrey Michael Courington, Chester, VA (US); Vishal Agrawal, Vernon Hills, IL (US); Sasi Eswarakava, Round Lake, IL (US); Massimo Notargiacomo, Castel Bolognese (IT); Stephen Turner, Mechanicsville, VA (US); Patrick William Henkle, Homer Glen, IL (US)

(73) Assignee: John Mezzalingua Associates, LLC, Liverpool, NY (US)

(*) Notice: Subject to any disclaimer, the term of this patent is extended or adjusted under 35 U.S.C. 154(b) by 0 days.

(21) Appl. No.: 16/928,147

(22) Filed: Jul. 14, 2020

(65) Prior Publication Data

US 2020/0344617 A1    Oct. 29, 2020

Related U.S. Application Data

(62) Division of application No. 16/547,982, filed on Aug. 22, 2019, now Pat. No. 10,750,378.
(Continued)

(51) Int. Cl.
*H04W 40/00* (2009.01)
*H04W 16/32* (2009.01)
(Continued)

(52) U.S. Cl.
CPC .......... *H04W 16/32* (2013.01); *H04W 24/02* (2013.01); *H04W 36/04* (2013.01); *H04W 84/105* (2013.01)

(58) Field of Classification Search
CPC ..... H04W 16/32; H04W 24/02; H04W 36/04; H04W 84/105; H04W 36/12;
(Continued)

(56) References Cited

U.S. PATENT DOCUMENTS 6,449,279 B1 * 9/2002 Belser ................. H04L 12/4608
370/355
6,542,739 B1 * 4/2003 Garner ............... H04B 7/18578
455/427

(Continued)

FOREIGN PATENT DOCUMENTS

| KR | 10-2012-0096703 A |   | 8/2012 |
| KR | 20120096703 A | * | 8/2012 |
| KR | 20150110008 A | * | 10/2015 |

OTHER PUBLICATIONS

CISCO: "TAI-based Routing for 20-bit and 28-bit eNB ID", MME Administration Guide, StarOS Release 21.2, Apr. 27, 2017, p. 1.

*Primary Examiner* — Mahendra R Patel
(74) *Attorney, Agent, or Firm* — Dentons US LLP (57) ABSTRACT

Disclosed is a system and methods for creating and maintaining a virtual subnetwork of telecommunication base stations within a wider telecommunication network. In an LTE-based example, the subnetwork includes a connection aggregator that is coupled between the plurality of eNodeBs internal to the subnetwork and one or more MMEs in the outer network. The connection aggregator intercepts all control plane messages between the MMEs and the internal eNodeBs, remaps eNodeB identifiers, and transmits repackaged messages so that the outer network sees the entire subnetwork as a single "giant" eNodeB. The disclosed system and methods enables the operator of the virtual subnetwork to add and shut down eNodeBs as demand for connectivity fluctuates, and to do so such that all changes are unseen by the outer network.

12 Claims, 9 Drawing Sheets

Related U.S. Application Data (60) Provisional application No. 62/721,963, filed on Aug. 23, 2018.

(51) Int. Cl.
*H04W 24/02* (2009.01)
*H04W 36/04* (2009.01)
*H04W 84/10* (2009.01)

(58) Field of Classification Search
CPC .............. H04W 36/30; H04L 41/0893; H04L 63/0272; H04L 69/22
USPC ........................................................ 455/446
See application file for complete search history.

(56) References Cited

U.S. PATENT DOCUMENTS

| | | | | |
|---|---|---|---|---|
| 6,690,939 | B1 | 2/2004 | Jonsson | H04W 36/18 370/331 |
| 7,584,298 | B2* | 9/2009 | Klinker | H04L 43/00 370/229 |
| 8,191,136 | B2* | 5/2012 | Dudfield | H04L 43/0894 726/22 |
| 8,743,893 | B2* | 6/2014 | Cowie | H04L 43/04 370/401 |
| 8,982,772 | B2 | 3/2015 | Fischer | H04K 3/822 370/310 |
| 9,125,239 | B2 | 9/2015 | Aalto | H04W 92/02 |
| 9,258,335 | B1* | 2/2016 | Taylor | H04L 67/2828 |
| 9,622,286 | B2 | 4/2017 | Hakkinen | H04W 76/38 |
| 9,674,754 | B2 | 6/2017 | Fitzpatrick | H04W 36/30 |
| 9,712,386 | B1* | 7/2017 | Chen | H04L 41/0893 |
| 9,843,624 | B1* | 12/2017 | Taaghol | H04L 63/0227 |
| 9,929,964 | B2* | 3/2018 | Saavedra | H04L 45/50 |
| 9,973,455 | B1* | 5/2018 | Fowler | H04L 51/18 |
| 10,470,097 | B2 | 11/2019 | Lee | H04W 36/0055 |
| 2005/0125511 | A1* | 6/2005 | Hunt | H04L 41/0856 709/220 |
| 2010/0217971 | A1* | 8/2010 | Radhakrishnan | H04L 69/22 713/153 |
| 2010/0303092 | A1* | 12/2010 | Chinnaswamy | H04L 41/0806 370/465 |
| 2011/0182180 | A1* | 7/2011 | Riddle | H04L 41/0893 370/230 |
| 2012/0003974 | A1 | 1/2012 | Nylander | H04W 92/02 455/435.2 |
| 2012/0143387 | A1 | 6/2012 | Indovina | H02J 13/0079 700/297 |
| 2013/0035885 | A1 | 2/2013 | Sharon | G06F 30/18 702/61 |
| 2014/0018076 | A1 | 1/2014 | Zhou | H04W 36/32 455/436 |
| 2014/0187247 | A1 | 7/2014 | Sarkar | H04W 36/30 455/437 |
| 2014/0213259 | A1 | 7/2014 | Teyeb | H04W 36/0094 455/436 |
| 2015/0003256 | A1 | 1/2015 | Ivershen | H04W 24/08 370/241 |
| 2015/0110008 | A1* | 4/2015 | Puthenpura | H04W 16/18 370/329 |
| 2015/0237547 | A1* | 8/2015 | Martinez Tarradell | H04W 76/27 455/436 |
| 2015/0257051 | A1* | 9/2015 | Rao | H04W 24/02 455/439 |
| 2015/0271865 | A1* | 9/2015 | Carson | H04W 28/08 370/329 |
| 2017/0347272 | A1* | 11/2017 | Ahmavaara | H04W 48/12 |
| 2017/0367022 | A1 | 12/2017 | Chandrasekaran | H04W 36/22 |
| 2018/0295607 | A1 | 10/2018 | Lindoff | H04L 5/0091 |
| 2019/0005317 | A1 | 1/2019 | Uhlemann | G06K 9/00362 |
| 2019/0239191 | A1 | 8/2019 | Zee | H04W 36/0016 |
| 2019/0320372 | A1 | 10/2019 | Zhang | H04W 24/10 |

\* cited by examiner

SYSTEM AND METHOD FOR CREATING AND MANAGING PRIVATE SUBNETWORKS OF LTE BASE STATIONS

This application is a divisional application of U.S. patent application Ser. No. 16/547,982 filed Aug. 22, 2019, which claims the benefit of U.S. Provisional Application No. 62/721,963 filed Aug. 23, 2018, which are hereby incorporated by reference in their entirety for all purposes as if fully set forth herein.

BACKGROUND OF THE INVENTION

Field of the Invention

The present invention relates to wireless communications base stations, and more particularly, to a system and method for creating private subnetworks of LTE base stations for use in large venues and urban settings.

Related Art

In the current state of development for LTE, anyone deploying a base station (eNodeB), whether a network operator, neutral host, etc., makes that eNodeB available to the greater mobile network, including all information related to the capabilities of the eNodeB. In many cases, the entity may deploy a plurality of eNodeBs as a local network. This is typically done in a large venue, such as a stadium, airport, university campus, etc. In this case, the capabilities of each deployed eNodeB are known to the greater mobile network.

A disadvantage of the current state is that there is currently no way for anyone deploying a network of eNodeBs to reconfigure or redesign the network without it impacting the entire network. There is currently no way for someone to deploy an LTE subnetwork in such a way that the inner workings of the subnetwork are hidden from the greater network.

A further disadvantage of the current state is as follows. A given eNodeB is identified by a 20 bit identifier (eNB ID). Each eNodeB can support up to 256 cells, each of which is identified by a global cell identifier (E-CGI) that appends the 20 bit eNB ID with a unique 8 bit pattern. Although each eNodeB may, in theory, support 256 cells, this is basically impossible due to computing constraints. In practice, each eNodeB typically supports a maximum of approximately twelve cells. This not only limits the potential usefulness of a given eNodeB, but it also leads to inefficient use of E-CGI address space.

Accordingly, there is a need for a system and method for creating and maintaining an LTE private subnetwork whereby the subnetwork is seen by the greater network as a single eNodeB, in which the complexities of the subnetwork are hidden from the greater network, and in which the subnetwork may be redesigned, and/or dynamically reconfigured as needed, in a way that is transparent to the greater network, and in which the eNodeB may make full use of the capability of servicing as many as 256 cells.

SUMMARY OF THE INVENTION

An aspect of the present invention involves a telecommunication system, which comprises a plurality of internal baseband processors, and a connection aggregator coupled to the plurality of internal baseband processors, wherein the connection aggregator maintains a plurality of internal identifiers, each corresponding to one of plurality of internal baseband processors. The connection aggregator is configured to intercept an outbound message from an internal baseband processor, replace the internal baseband processor's internal identifier within the outbound message with a virtual subnetwork baseband processor identifier, and transmit the modified outbound message. The connection aggregator is further configured to intercept an inbound message to a destination internal baseband processor, replace the virtual subnetwork baseband processor identifier within the inbound message with a destination internal identifier to create a modified inbound message, and transmit the modified inbound message to the destination internal baseband processor.

Another aspect of the present invention involves a method for configuring a telecommunication subnetwork. The method comprises intercepting a plurality of PWS restart indication messages, each of the plurality of PWS restart messages coming from an internal eNodeB; extracting an internal eNodeB identifier and one or more cell IDs from each intercepted PWS restart indication message; assigning each internal eNodeB identifier and corresponding one or more cell IDs to a memory; and transmitting a subnetwork PWS restart indication message. The subnetwork PWS restart indication message includes a virtual subnetwork baseband processor identifier and the one or more cell IDs from the plurality of PWS restart indication messages.

Another aspect of the present invention involves a method for configuring a telecommunication subnetwork. The method comprises intercepting a plurality of initiation messages from a corresponding plurality of internal baseband processors, wherein each initiation message includes an internal identifier and at least one cell ID for each cell corresponding to the internal baseband processor; extracting the internal identifier and the at least one cell ID from each initiation message; storing each internal identifier and each at least one cell ID in a memory; generating a virtual subnetwork baseband processor identifier; and transmitting a subnetwork initiation message, wherein the subnetwork initiation message includes the virtual subnetwork baseband processor identifier and each one or more cell IDs.

Another aspect of the present invention involves a method for establishing a connection between a source internal baseband processor and a target internal baseband processor within a telecommunication subnetwork. The method comprises generating a source internal baseband processor identifier; generating a target internal baseband processor identifier; generating a source configuration transfer message, the source configuration transfer message including the source internal baseband processor identifier and the target internal baseband processor identifier; transmitting the source configuration transfer message to a mobility management entity; intercepting the source configuration transfer message to the mobility management entity; extracting the source internal baseband processor identifier and the target internal baseband identifier from the source configuration transfer message; generating a target configuration transfer message, the target configuration transfer message including the source internal baseband processor identifier and the target internal baseband processor identifier; and transmitting the target configuration transfer message to the target internal baseband processor.

Another aspect of the present invention involves a method for handing over a UE's call from an internal eNodeB within a telecommunication subnetwork to an external eNodeB. The method comprises sending a Handover Required message, the Handover Required message including an internal eNodeB identifier and a target eNodeB identifier; intercepting the Handover Required message; replacing the internal eNodeB identifier with a virtual subnetwork eNodeB identifier to generate a subnetwork Handover Required message; transmitting the subnetwork Handover Required message to an MME; receiving a Handover Command from the MME; replacing the virtual subnetwork eNodeB identifier with the internal eNodeB identifier to generate a subnetwork Handover Command message; and transmitting the subnetwork Handover Command message to the internal eNodeB for transmission to the UE.

Another aspect of the present invention involves a method for reconfiguring a telecommunication subnetwork. The method comprises assessing demand for connectivity within the telecommunication subnetwork; identifying a low-activity internal baseband processor; handing off one or more UE connections from the low-activity internal baseband processor to one or more neighboring internal baseband processors; shutting down the low-activity internal baseband processor; and removing an internal eNodeB identifier and at least one cell ID corresponding to the low-activity internal baseband processor from a memory corresponding to active internal baseband processors.

Another aspect of the present invention involves a method for reconfiguring a telecommunication subnetwork. The method comprises assessing demand for connectivity within the telecommunication subnetwork; identifying one or more high-demand internal baseband processors; instantiating a virtual internal baseband processor; assigning to the virtual internal baseband processor one or more cells; handing off UE connections from the one or more high-demand baseband processors to the virtual baseband processor; sending an initiation message, the initiation message including an internal identifier and one or more cell IDs corresponding to the virtual baseband processor; intercepting the initiation message; and retrieving from the initiation message and storing the internal identifier and the one or more cell IDs.

Another aspect of the present invention involves a method for determining a location of an event within a venue. The method comprises intercepting a first plurality of call establishment messages, each call establishment message coming from one of a plurality of UEs; determining if each call establishment message within the first plurality of call establishment messages corresponds to a voice call; determining a second plurality of call establishment messages, wherein each of the second plurality of call establishment messages corresponds to a voice call; retrieving a call establishment message time corresponding to each of the second plurality of call establishment messages; retrieving an internal baseband processor identifier from each of the second plurality of call establishment message; and identifying a cluster of call establishment messages within the second plurality of call establishment messages, wherein the cluster of call establishment messages correspond to a single eNodeB and wherein the call establishment time corresponding to each of the cluster of call establishment messages occur within a narrow window of time.

DESCRIPTION OF EXEMPLARY
EMBODIMENTS

Figure 1:
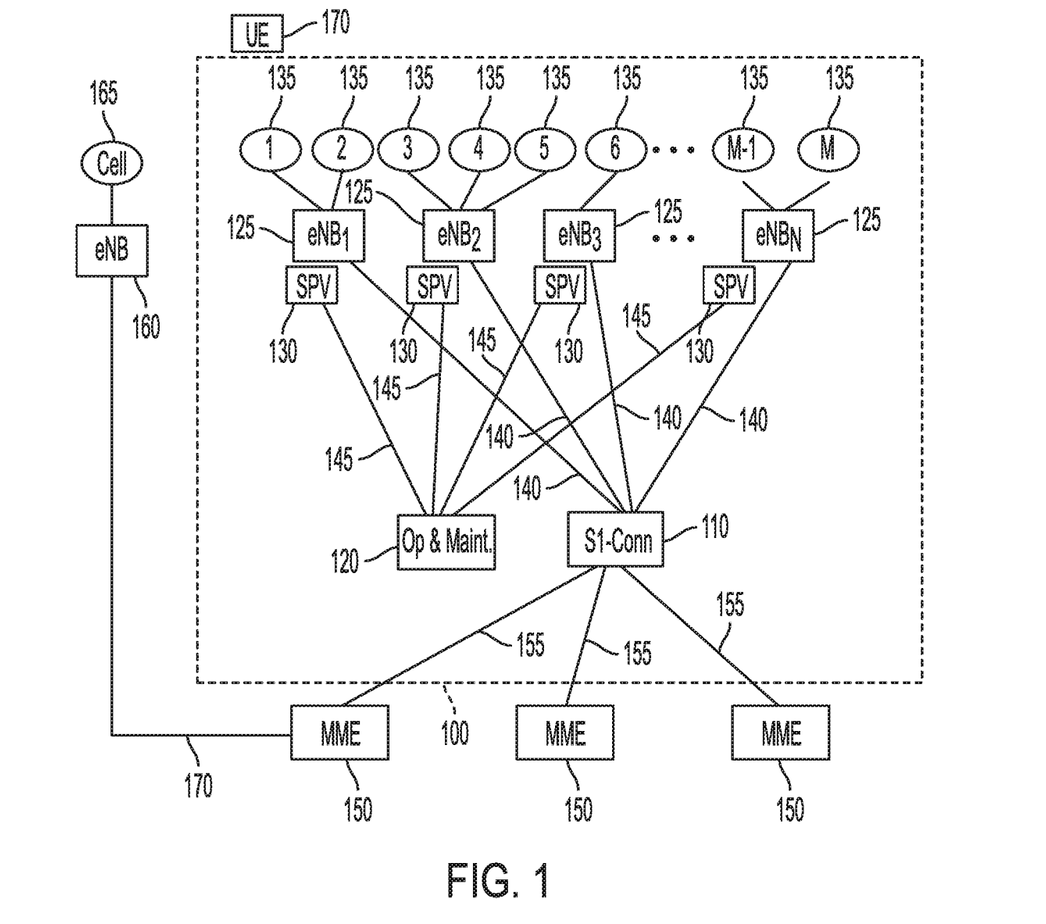
FIG. 1 illustrates an exemplary private subnetwork of LTE base stations according to the disclosure.

FIG. 1 illustrates an exemplary private subnetwork of LTE base stations (hereinafter subnetwork 100) according to the disclosure. Subnetwork 100 comprises a connection aggregator (hereinafter S1-Conn 110); an operation and maintenance module 120; a plurality of internal baseband processors (or internal eNodeBs 125), each of which has a corresponding supervisor module 130, and each of which has one or more corresponding cells 135. Each internal eNodeB 125 is coupled to the S1-Conn 110 by a respective internal S1 connection 140, which is a standard S1 connection as would be implemented between a conventional eNodeB and a conventional MME (Mobility Management Entity) as defined in the LTE specification. Each supervisor module 130 may be coupled to the operation and maintenance module 120 by a conventional IP connection 145.

S1-Conn 110 may be coupled to one or more MMEs 150 via a corresponding external S1 connection 155. Each external S1 connection 155 may be identical to each internal S1 connection 140 in that they each are standard S1 connections as defined in the LTE specification.

Also illustrated in FIG. 1 is an external eNodeB 160 having at least one corresponding cell 165. External eNodeB 160 may be coupled to one or more of the illustrated MMEs 150 via an S1 connection 170. Further illustrated is a UE 170, which may be in communication with one or more cells 135/165.

Subnetwork 100 may be deployed or integrated in, for example, a dense urban environment or a large venue, such as a stadium, airport, shopping center, university campus, etc. Each internal eNodeB 125 may correspond to macro cell, a small cell, femto cell, or a Distributed Antenna System (DAS). Each internal eNodeB 125 may have any number of cells 135.

Each individual internal eNodeB 125 may be individually implemented as a pure software-based virtual baseband processor that may be instantiated and de-instantiated as needed, or each may be individually implemented as a hardware-based baseband processor that is deployed in dedicated hardware in close proximity to its corresponding RF and antenna components, or any combination of the above. Although an LTE-specific term is used to refer to a given eNodeB 125, it may actually be implemented according to a different or legacy RAT technology, as long as it communicates with S1-Conn 110 via an S1 interface. As used herein, the terms baseband processor and eNodeB may be interchangeable.

S1-Conn 110 and operation and maintenance module 120 (and potentially one or more of the internal eNodeBs 125) may be implemented in software that runs in a conventional server hardware that may be located in a single location (e.g., one or more racks) within or near the venue where subnetwork 100 is deployed, or otherwise distributed. There may be an advantage to having the internal eNodeBs 125 pure software-based virtual baseband processors in that they can make the best advantage of the ability of the subnetwork 100 to dynamically instantiate and de-instantiate internal eNodeBs 125 as traffic demand within the venue fluctuates. Further, having each internal eNodeB 125 implemented purely in software enables each internal eNodeB 125 to be instrumented with code to enable interaction with its corresponding supervisor module 130 and easier configuration and maintenance from operation and maintenance module 120. However, it will be understood that hardware-based internal eNodeBs 125 may be activated/de-activated in place of instantiation/de-instantiation of a virtual internal eNodeB 125.

Figure 2:
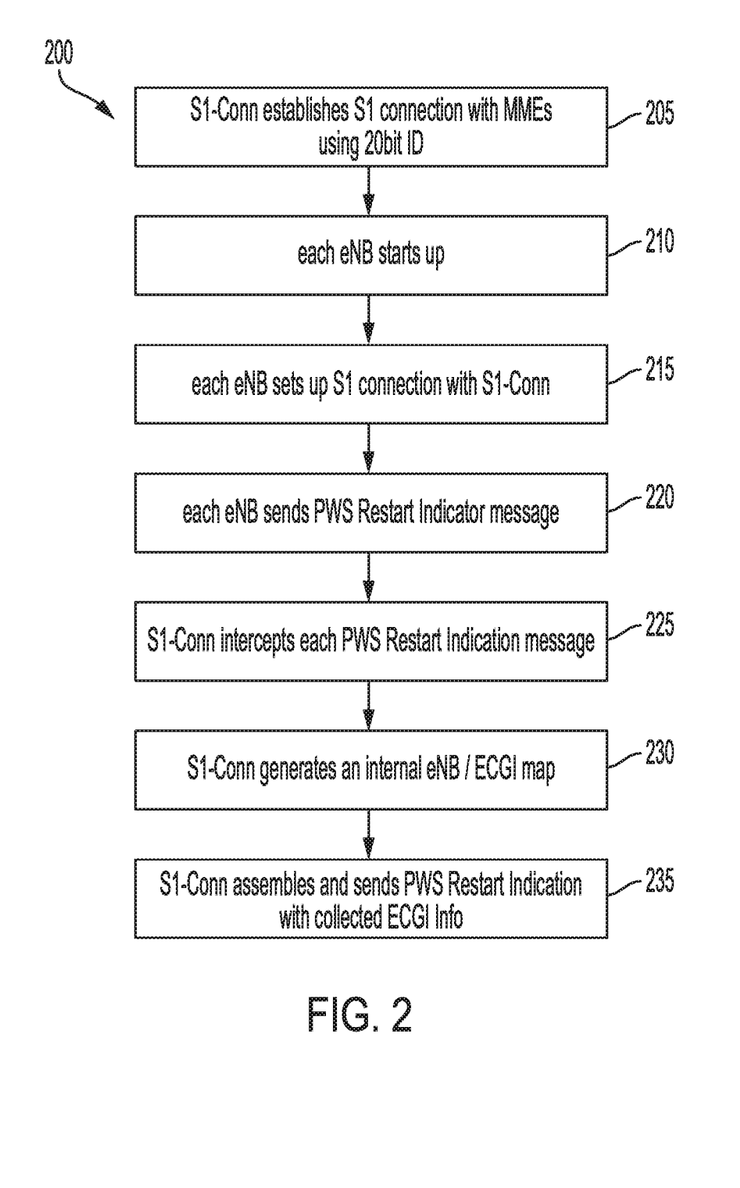
FIG. 2 illustrates an exemplary process for configuring a private subnetwork of LTE base stations according to the disclosure.

FIG. 2 illustrates an exemplary process for configuring a subnetwork 100 according to the disclosure.

In step 205, S1-Conn 110 establishes an S1 interface with each of the MMEs 150. In doing so, S1-Conn 110 issues an S1 SETUP REQUEST message to each of the MMEs 150, which includes its own 20 bit eNB ID (the virtual subnetwork baseband processor identifier) and all of the E-CGIs corresponding to each of the constituent cells of all of the internal eNodeBs 125. In response, each MME 150 may send a subsequent S1 SETUP RESPONSE message to S1-Conn 110, thereby establishing an external S1 Connection 155 between the S1-Conn 110 and each MME 150.

In step 210, each internal eNodeB 125 starts up according to its nominal function. Each internal eNodeB 125 has the same 20 bit identifier, and a number of allocated 8 bit subidentifiers for each possible cell 135 that might correspond to that particular internal eNodeB 125. This information may be stored in a configuration file within each internal eNodeB 125 and may be supplied by its corresponding supervisor module 130. Alternatively, configuration information for each internal eNodeB 125 may be stored in a distributed data source. Examples of such distributed data sources may include systems like consul and etc. Given that all of the internal eNodeBs 125 have the same 20 bit identifier, in order to uniquely identify each internal eNodeB 125, each one may select a 8 bit cell identifier of one of its cells 135 (for example, its first cell 135) and append it to its own 20 bit identifier, making it a 28 bit eNodeB identifier. The internal identifier may be the same as that used conventionally with Home eNodeBs (HeNB). This internal 28 bit eNodeB identifier may be referred to herein as an "internal identifier".

Once it has started up, in step 215, each internal eNodeB 125 sets up an S1 connection with S1-Conn 110, using its individual internal 28 bit eNodeB identifier. An example of how the internal eNodeB 125 may establish an S1 connection with an MME 150 is described in 3GPP TS 36.413. In doing so, the given internal eNodeB 125 functions as if it is establishing an S1 connection with each MME 150. However, S1-Conn 110 intercepts each S1 SETUP REQUEST from each internal eNodeB. S1-Conn 110 uses this information to establish an S1 interface with each internal eNodeB 125 and subsequently generates and issues an S1 SETUP RESPONSE message to each of the internal eNodeBs 125. In doing so, each of the internal eNodeBs 125 "thinks" that it has established an S1 interface with a single MME that has a lot of capabilities (actually the collective capabilities of the MMEs 150), but what it has actually done is establish an internal S1 connection 140 with the S1-Conn 110.

In step 220, each internal eNodeB 125 sends an initiation message that would otherwise indicate to one or more MMEs 150 that it is functioning. This initiation message would include its own identity and the cell identities of its corresponding cells 135. In an exemplary embodiment of process 200, each internal eNodeB 125 sends a PWSRestartIndication message, which is intercepted by S1-Conn 110. The PWSRestartIndication message, an example of which is described in 3GPP TS 36.413, includes the following information: the E-CGI (Enhanced Cell Global ID) of each cell corresponding to the sending internal eNodeB 125, the Global eNB ID for the sending internal eNodeB 125 (which is its aforementioned internal 28 bit eNodeB identifier), the TAI (Tracking Area Identifier) list for the internal eNodeB's 125 corresponding cells, and the Emergency Area ID list for the internal eNodeB's 125 corresponding cells.

It will be understood that the described functions performed by each internal eNodeB 125 may correspond to a sequence of computer instructions stored on a machine readable memory allocated to or associated with each corresponding internal eNodeB 125, and executed either by a dedicated processor embedded within corresponding eNodeB 125 or by a server processor or virtual machine spawned in a cloud computing environment running on server hardware located within the venue of subnetwork 100 or elsewhere. The same is true for the S1-Conn 110 and the operation and maintenance module 120. These components may comprise computer instructions that may be stored in non-volatile memory and executed on server compute hardware that may be located in, near, or distributed around the venue corresponding to subnetwork 100. Each of these components may be implemented in C, C++, Java, one or more scripting languages, or any combination thereof, depending on the given subcomponent within each of these components.

In step 225, S1-Conn 110 intercepts each PWSRestartIndication message from each internal eNodeB 125, and in step 230, creates a mapping of the following for each internal eNodeB 125: its internal 28 bit eNodeB identifier, its constituent cell IDs (E-CGIs), and the rest of the information provided in its corresponding PWSRestartIndication message. Further to step 230, S1-Conn 110 assigns itself the 20 bit eNodeB ID common to all of the internal eNodeBs 125, extracts the constituent cells IDs (E-CGIs) and further information gathered from each corresponding PWSRestartIndication message and populates this information in a new "repackaged" PWSRestartIndication Message. The 20 bit eNodeB ID assigned to the S1-Conn 110 may be referred to as a virtual subnetwork baseband processor identifier.

In step 235, S1-Conn 110 sends its own PWSRestartIndication message assembled in step 225 to each corresponding MME 150 via its respective external S1 connection 155.

Accordingly, each MME 150 will behave as though it is interacting with a single "giant" eNodeB with a potentially large number of aggregated cells 135 (potentially as many as 256 cells), even though each MME 150 is interacting exclusively with S1-Conn 110. Further, each internal eNodeB 125 will behave as though it is interacting with any of MMEs 150, even though it is interacting exclusively with S1-Conn 110. In order to accomplish this, S1-Conn 110 intercepts each subsequent message, bidirectionally, between a given MME 150 and an internal eNodeB 125, and also between the MME 150 a given UE 170. S1-Conn 110 remaps the cell IDs and other required information using— for example—look up tables stored in memory allocated to S1-Conn 110, repackages the given message with the remapped information, and sends the repackaged message to its destination. For the purposes herein, the internal eNodeB 125 that is the destination of the incoming message from a given MME 150 may be referred to as a message destination baseband processor.

Advantages of this include the following. First, any given (non-Home) eNodeB has a 20 bit identifier and may have allocated to it as many as 256 cells, given that the cell ID for each eNodeB is an 8 bit identifier. However, given the practical limitations in computational power, any given eNodeB typically has no more than a dozen cells. The disclosed subnetwork 100 enables a given eNodeB (in this case, the S-Conn 110 acting like a "giant" eNodeB) to make use of all 8 bits of cell IDs. This is because each internal eNodeB 125 has allocated to it (either in dedicated hardware or provisioned cloud computing resources) sufficient memory and computational resources to handle a typical number of cells commonly used.

Second, given that the external network (e.g., from the MMEs 150 outward) is only aware of a single "giant" eNodeB encompassed by the functions of S1-Conn 110, the number of internal eNodeBs 125 (and subsequent number of cells 135) may be dynamically adjusted according to traffic demand. This may be extremely useful for venues, such as stadiums, that may be filled to capacity one day a week and quiet the rest of the time. In this case, internal eNodeBs 125, each with a plurality of corresponding cells 135, may be created and allocated to handle changes in traffic demand, such that all of these changes are hidden to the outer network.

It will be understood that the described functions performed by the S-Conn 110 is further describing a sequence of computer instructions stored on a machine readable memory allocated to or associated with the S1-Conn 110, and executed either by a dedicated processor or by a server processor or virtual machine spawned in a cloud computing environment running on server hardware located within the venue of subnetwork 100 or elsewhere.

Figure 3:
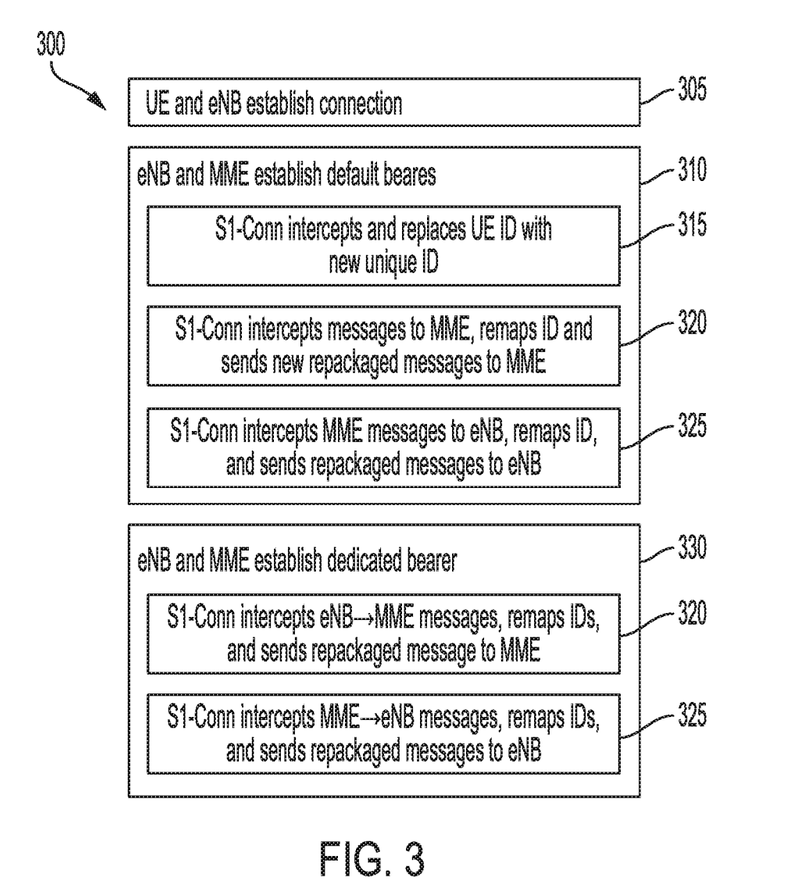
FIG. 3 illustrates an exemplary process by which a UE establishes connection with an eNodeB internal to the private subnetwork.

FIG. 3 illustrates an exemplary process 300 by which a UE 170 establishes connection with an internal eNodeB 125.

In step 305, the UE 170 and the given internal eNodeB 125 exchange appropriate conventional signals to establish a connection. For example, UE 170 may transmit an RRC Connection Request to the internal eNodeB 125, which may in turn respond with an RRC Connection Setup message, etc. The result is that UE 170 is connected to internal eNodeB 125 and that internal eNodeB 125 has established an internal identifier corresponding to that UE.

In subprocess 310, internal eNodeB 125 establishes a default bearer with an MME 150 via S1-Conn 110. As illustrated in FIG. 3, subprocess 310 comprises several steps that are added to the default bearer establishment procedures specified in 3GPP TS 24.301, for example. steps 315, 320, and 325 describe modifications/enhancements to the conventional procedures described in the 3GPP technical specifications.

In step 315, S1-Conn 110 intercepts the default bearer establishment messages sent by internal eNodeB 125, which includes a UE ID generated by the internal eNodeB 125.

In step 320, the S1-Conn replaces the UE ID (generated by the internal eNodeB 125) and replaces it with a unique UE ID generated by the S1-Conn 110. This is necessary because each of the internal eNodeBs 125 generate UE IDs without any awareness of the UE IDs generated by any of the other internal eNodeBs 125. There is a significant chance of two eNodeBs 125 generating duplicate UE IDs. Given this possibility, S1-Conn replaces the UE ID generated by the internal eNodeB 125 with a unique value, repackages the message, and transmits the message to the appropriate MME 150.

In step 325, S1-Conn 110 intercepts default bearer establishment messages from the MME 150 to the internal eNodeB 125, remaps the UE ID, and transmits the repackaged message to the internal eNodeB 125.

The objective is that the given internal eNodeB 125 is not aware that it is not interacting directly with MME 150, and that the MME 150 is not aware that it is not interacting directly with internal eNodeB 125. In the former case, S1-Conn 110 is acting as the MME 150 for the internal eNodeB 125, and in the latter case, S1-Conn 110 is acting as the eNodeB that interacts with the MME 150 (and the UE 170).

In subprocess 330, internal eNodeB 125 establishes a dedicated bearer with an MME 150 via S1-Conn 110. As illustrated in FIG. 3, subprocess 330 comprises several steps that are added to the default bearer establishment procedures specified in 3GPP TS 24.301. The steps required for establishing a dedicated bearer may be substantially identical to steps 320 and 325 described above. The result is that there is at least one dedicated bearer established between UE 170 and MME 150, whereby S1-Conn 110 is serving as an unseen intermediary between internal eNodeB 120 and MME 150.

Figure 4:
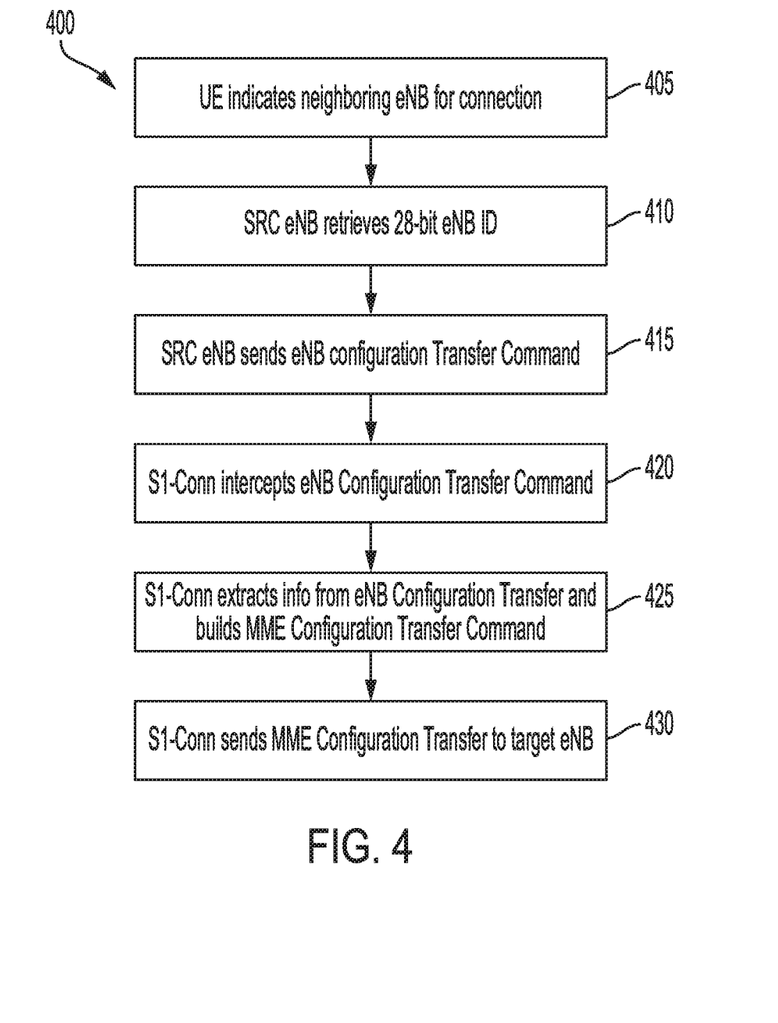
FIG. 4 illustrates an exemplary process for establishing an X2 connection between two eNodeBs within the private subnetwork according to the disclosure.

FIG. 4 illustrates an exemplary process 400 for establishing an X2 connection between two internal eNodeBs 125.

In step 405, UE 170 communicates with its currently connected source internal eNodeB 125 that it has a strong signal from another internal eNodeB 125. UE 170 does so by transmitting a measurement report to the source internal eNodeB 125, which identifies neighboring internal eNodeBs 125 and cell 135 from which UE 170 is receiving a strong signal. Step 405 may be a conventional process, an example of which is described in 3GPP TS 36.300. From this information UE 170 identifies and recommends a target internal eNodeB 125 for handover.

In step 410, the source internal eNodeB 125 retrieves its own internal 28 bit identifier from internal memory. Recalling from step 210, each internal eNodeB has as a default the same 20 bit eNodeB identifier. In order to prevent collisions within subnetwork 100, each internal eNodeB's supervisor module 120 instructs its respective internal eNodeB 125 to select the 8 bit identifier of one of its cells (e.g., the first cell) and append its own 20 bit identifier with the 8 bit identifier of its cell, creating a false Home eNodeB (HeNB) internal identifier for itself, referred to herein as an internal eNodeB identifier. Further to step 410, the source internal eNodeB 125 retrieves the E-CGI for the target cell identified by the UE (via the measurement report) and uses that 28 bit cell identifier corresponding to the target eNodeB.

In step 415, the source internal eNodeB 125 sends an eNBConfigurationTransfer command, which is conventionally sent to one of the MMEs 150. In the eNBConfigurationTransfer command, the source internal eNodeB 125 is identifying itself with its internal eNodeB identifier and the internal eNodeB identifier for the target internal eNodeB identifier.

In step 420, S1-Conn 110 intercepts the eNBConfigurationTransfer transmitted in step 415. In step 425, S1-Conn 110 extracts the internal eNodeB identifier of the source internal eNodeB 125 and the internal eNodeB identifier of the target internal eNodeB 125 (as well as other information in the eNBConfigurationTransfer command) and constructs an MMEConfigurationTransfer command with this information. And in step 430, S1-Conn sends the MMEConfigurationTransfer command to the target internal eNodeB 125.

With the configuration transfer complete, source internal eNodeB 125 and target eNodeB 125 may establish an X2 connection between them. In performing the steps of process 400, S1-Conn 110 is acting as the MME 150 such that neither source internal eNodeB 125 nor target eNodeB 125 is aware that they were not communicating directly with MME 150. Further, MME 150 was not at any point involved in the process. This is because MME 150 sees the S1-Conn 110 as a "giant" eNodeB and thus there would be no X2 connection, given only one eNodeB.

Figure 5:
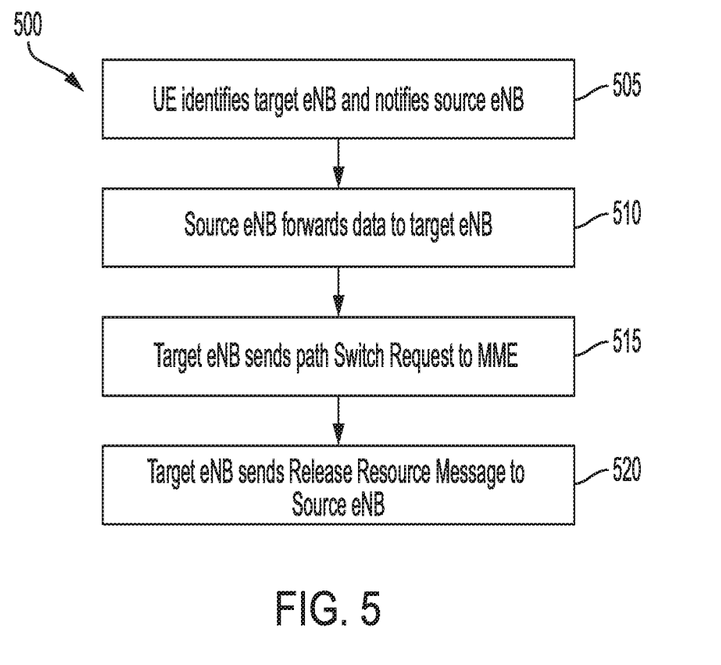
FIG. 5 illustrates an exemplary process for executing an X2 handover between two eNodeBs that are internal to the private subnetwork.

FIG. 5 illustrates an exemplary process 500 for executing an X2 handover between two internal eNodeB s 125.

In step 505, the UE 170 identifies a target cell 135 and target internal eNodeB 125 and notifies the source internal eNodeB 125, to which the UE 170 is currently connected. This process may be substantially similar to step 405 of process 400.

In step 510, the source internal eNodeB 125 forwards any data packets (downlink and potentially uplink) corresponding to UE 170 to target internal eNodeB 125 over the X2 connection that was established in process 400.

In step 515, the target internal eNodeB 125 sends a Path Switch Request message to the relevant MME 150. The Path Switch Request includes the TAI (Tracking Area Identity) of the target cell 135 of the target internal eNodeB 125 as well as the target cell's E-CGI. S1-Conn 110 relays this message to the relevant MME 150.

In step 520, target internal eNodeB 125 sends a Release Resource message to the source internal eNodeB 125 over their mutual X2 connection, thus completing the handover process of a UE 170 between two internal eNodeBs 125 within subnetwork 100 in a way that is hidden from the outer network.

Figure 6:
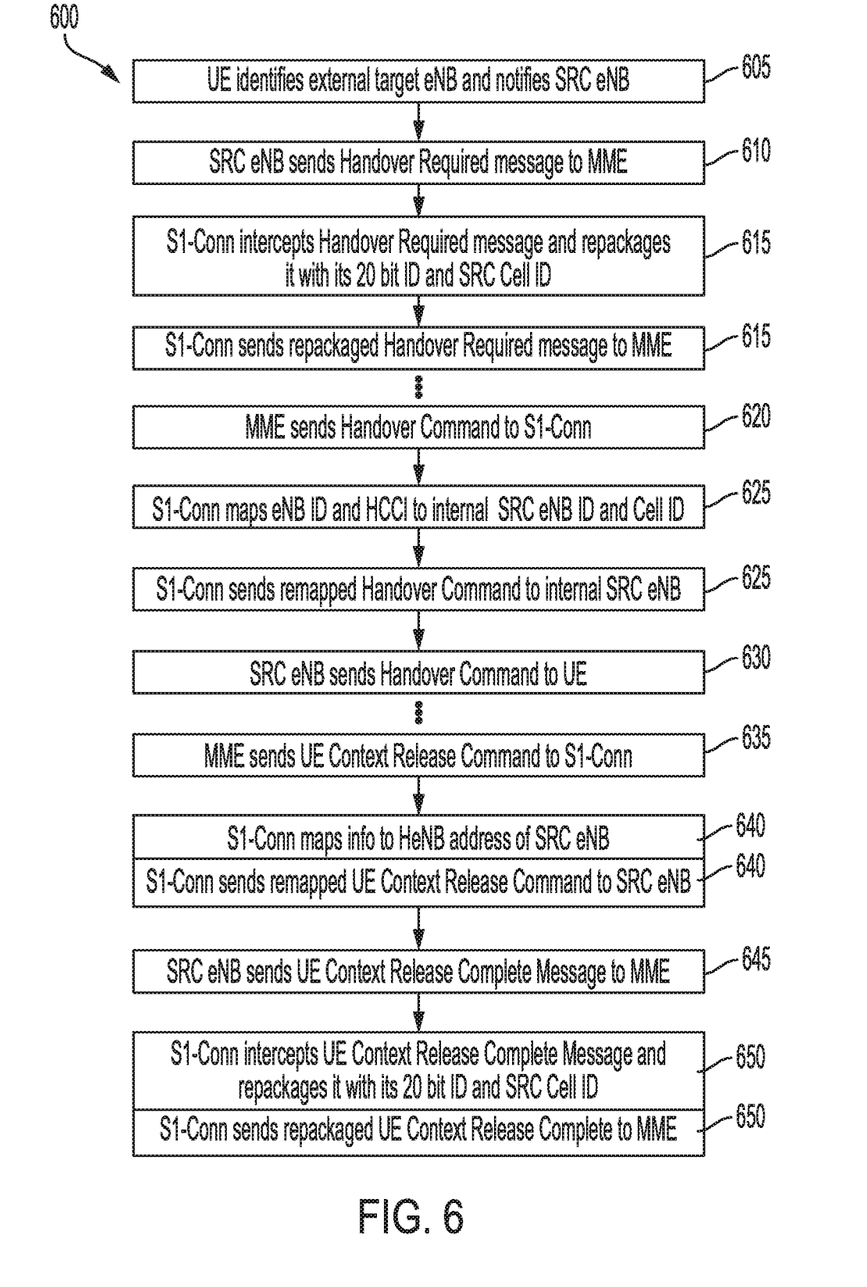
FIG. 6 illustrates an exemplary process for executing an S1 handover between an eNodeB internal to the private subnetwork to an eNodeB that is external to the private subnetwork.

FIG. 6 illustrates an exemplary process 600 for executing an S1 handover between an internal eNodeB 125 to an external eNodeB 160. This is for the situation in which UE 170 is moving out of range of the internal eNodeBs 125 of subnetwork 100. The steps of process 600 may be incorporated into the S1-based handover process.

In step 605, the UE 170 identifies a target cell 165 and target external eNodeB 160 and notifies the source internal eNodeB 125, to which the UE 170 is currently connected. This process may be substantially similar to step 405 of process 400 and step 505 of process 500.

In step 610, the source internal eNodeB 125 sends a Handover Required message to the relevant MME 150. In doing so, source internal eNodeB 125 uses its internal eNodeB identifier in the message.

In step 615, S1-Conn 110 intercepts the Handover Required message and repackages the message with its own 20 bit virtual subnetwork baseband processor identifier and the E-CGI of the cell currently connecting UE 170 with source internal eNodeB 125, and sends the message to the relevant MME 150.

In step 620, MME 150 sends a Handover Command to S1-Conn 110. It will be understood that MME 150 behaves as though it were interacting with a conventional eNodeB.

In step 625, S1-Conn 110 receives the Handover Command from MME 150 and remaps the eNB ID to the internal eNodeB identifier of the source internal eNodeB 125, and sends the repackaged Handover Command to the source internal eNodeB 125. Subsequently, in step 630, source internal eNodeB 125 sends the Handover Command to UE 170.

If any of the E-RABs (Evolved Radio Access Bearers) corresponding to UE 170 are configured for PDCP (Packet Data Convergence Protocol) preservation, the source internal eNodeB 125 may send an eNB Status Transfer message to the relevant MME 150. S1-Conn 110 may intercept this message, remap the information in the message to specify the virtual subnetwork baseband processor identifier, repackage the message, and transmit it to the relevant MME 150 (the source MME).

In step 635, the source MME 150 sends a UE Context Release Command to the S1-Conn 110. In step 640, the S1-Conn 110 in turn remaps the eNB ID to the internal eNodeB identifier of the source internal eNodeB 125 and transmits the message to the source internal eNodeB 125.

In step 645, the source internal eNodeB 125 sends a UE Context Release Complete message to the source MME 150.

In step 650, the S1-Conn 110 intercepts the UE Context Release Complete message, remaps the information to reflect the virtual subnetwork baseband processor identifier, repackages the message, and transmits it to the source MME 150.

It will be understood that there are many steps to the conventional process of an S1-based handover, as described in 3GPP TS 23.401, that occur (for example) between steps 615 and 620, and between steps 620 and 635. These steps occur in the outer network (e.g., between MMEs 150, S-GW and P-GW (not shown) and external eNodeB 160. It is understood that these external steps are known and fully described in the referenced 3GPP documentation.

Accordingly, to the outer network, the S1-based handoff disclosed in process 600 involves a handoff between the "giant" eNodeB represented by S1-Conn 110 and external eNodeB 160. The inner workings of subnetwork 100 are hidden from the outer network.

Figure 7:
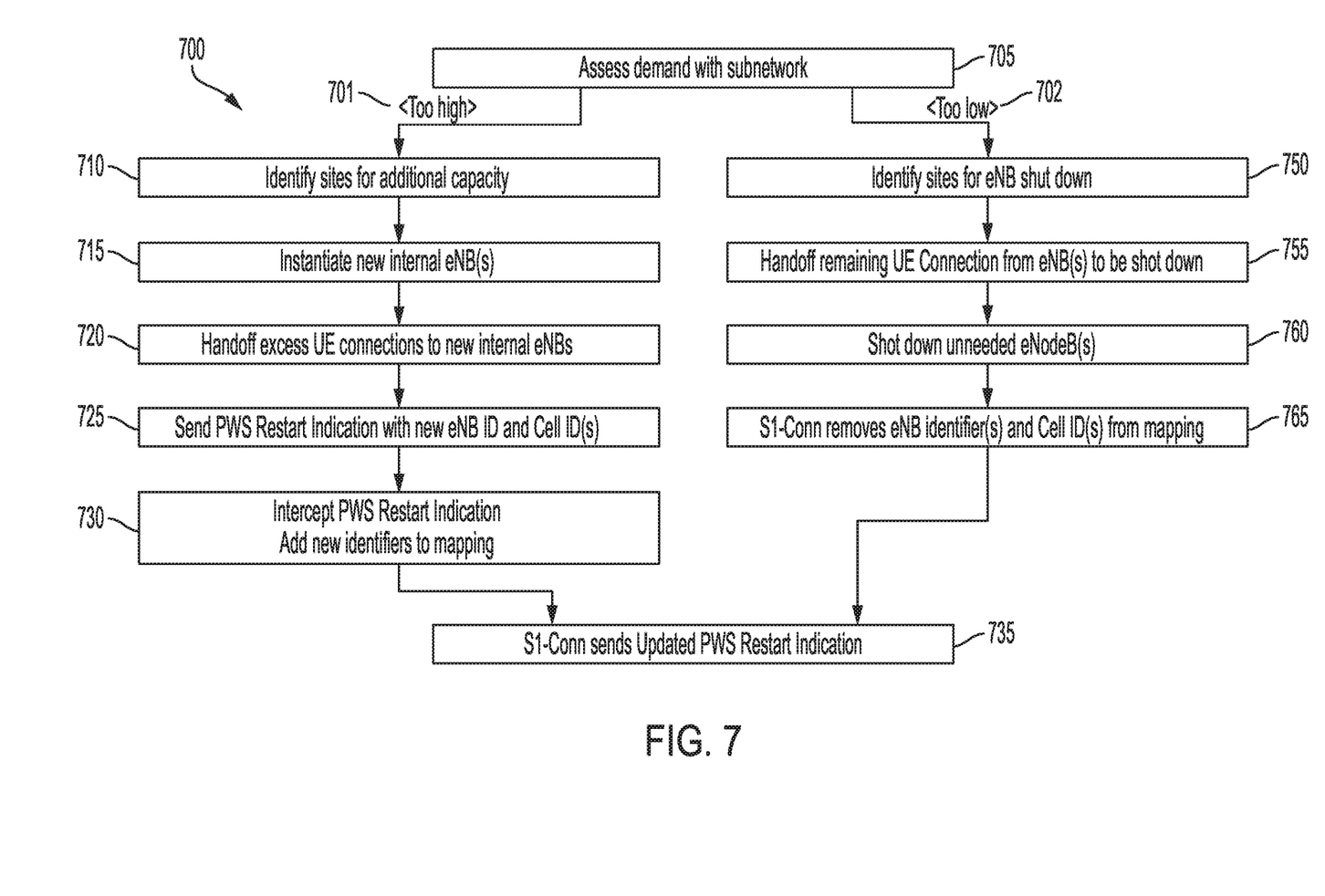
FIG. 7 illustrates an exemplary process for reconfiguring the private subnetwork based on an increase or decrease in traffic demand.

FIG. 7 illustrates an exemplary process 700 for reconfiguring subnetwork 100 based on an increase or decrease in traffic demand. This enables the subnetwork 100 to expand and contract based on demand while hiding the changes to the subnetwork from the outer network.

In step 705, the operation and maintenance module 120 may, in conjunction with the S1-Conn 110, make an assessment of current traffic usage and demand. This may involve analyzing historical usage data as well as extrapolating near future demand. For example, if subnetwork 100 is deployed in a stadium, operation and maintenance module 120 may have stored in accessible memory a calendar of upcoming events so that it can anticipate periods of high and low demands. For deployments such as in a dense urban setting, operation and maintenance module 120 may have accumulated historical data on demand based on time of day, day of week, holidays, and days with special events. Given this, operation and maintenance module 120 may be able to perform appropriate analytics to estimate current and near future demand, and take action accordingly to provide for the provisioning of cloud-based computing capacity for virtual internal eNodeBs 125, or to power up/down hardware-based internal eNodeBs 125.

Additionally, the virtual eNodeBs 125 may employ 3GPP-specified mechanisms for assessing (i.e., determining) demand, including setting a configurable threshold(s), and comparing actual demand to said threshold(s). The eNodeBs 125 can then send the results of the comparisons to the operation and maintenance module 120. The operation and maintenance module 120 can then further determine whether demand has dropped below a low threshold (e.g., 5% of configured maximum capacity) or whether demand has gone above a high threshold (e.g., 95% of configured maximum capacity). Alternatively, each of the eNodeBs can make the above described further determinations and send an alarm signal, or the like, to the operation and maintenance module 120 if either of the thresholds has been exceeded. This mechanism may use the standard PM-Stat files (Performance Measurement) that are generated every 15 minutes and transmitted to the core network via a northbound interface (not shown) that is also specified by 3GPP. It will be understood that such variations are possible and within the scope of the disclosure.

Depending on the result of the assessing done in step 705, process 700 may either take no action (not shown in FIG. 7); it may take subprocess path 701, in which operation and maintenance module 120 may increase the capacity of subnetwork 100 by adding one or more internal eNodeBs 125; or it may take subprocess path 702, in which operation and maintenance module 120 may reduce capacity by removing one or more internal eNodeBs 125.

Regarding subpath 701, if in the assessing in step 705 the operation and maintenance module 120 determines that additional capacity is required, operation and maintenance module 120 may proceed to step 710 and execute instructions to identify where within subnetwork 100 one or more additional internal eNodeBs 125 are needed. This may include determining the location of the internal eNodeBs 125 with the greatest demand and determining the availability of remote radio unit and antenna hardware in the vicinity, for example.

In step 715, operation and maintenance module 120 executes instructions to bring up one or more new internal eNodeBs 125. In doing so, operation and maintenance module 120 may execute instructions to have local server hardware instantiate one or more software-based virtual baseband processors, and/or to power up one or more dormant hardware-based base stations.

In step 720, operation and maintenance module 120 may issue instructions to S1-Conn 110 to command the currently-running high-demand internal eNodeBs 125 to handoff UE connections to the recently-introduced new internal eNodeBs 125. This may be alternatively done whereby the operation and maintenance module 120 may issue instructions to the appropriate supervisor modules 130, via IP connection 145, to have the corresponding internal eNodeBs 125 execute UE connection handoffs.

With the new eNodeBs 125 up and running, it is necessary to update the identifier mapping information within S1-Conn 110. Accordingly, in step 725, the newly online internal eNodeBs 125 may each issue a PWSRestartIndication message (or similar initiation message), indicating its internal eNodeB identifier and constituent cell IDs.

In step 730, S1-Conn 110 intercepts the one or more PWSRestartIndication messages, one from each newly online internal eNodeB 125, extracts the internal eNodeB identifier and corresponding cell IDs, and adds this information to the pre-existing mapping that S1-Conn 110 stores in its memory.

In step 735, S1-Conn may issue its own PWSRestartIndication to one or more MMEs 150, similarly to step 235 in process 200. In this case, the outer network is not aware of the addition of new internal eNodeBs 125. Instead, it is only aware of a single "giant" eNodeB that has one or more additional cells.

Regarding subpath 702, if in the assessing in step 705 the operation and maintenance module 120 determined that subnetwork 100 has excess capacity, operation and maintenance module 120 may proceed to step 750 and execute instructions to identify where within subnetwork 100 one or more additional internal eNodeBs 125 are to be shut down. This may include determining the location of the internal eNodeBs 125 with insufficient demand and the internal identifiers of neighboring eNodeBs 125 that might be available for handoff.

In step 755, operation and maintenance module 120 may execute instructions to command the internal eNodeBs 125 designated for shutdown to handoff UE connections to neighboring eNodeBs that are otherwise capable of servicing these UEs 170. As with step 720, this may happen one or more ways: whereby operation and maintenance module 120 issues instructions to S1-Conn 110 to command the handoffs, or operation and maintenance module 120 issues instructions to the relevant supervisor modules 130 to implement the handoffs. It will be understood that such variations are possible and within the scope of the disclosure.

In step 760, operation and maintenance module 120 may shutdown the internal eNodeBs 125 designated in step 750. In the case of software-based virtual internal eNodeBs 125, this may involve terminating the corresponding virtual machine running on the subnetwork's server hardware. Alternatively (or additionally) this may involve powering down appropriate hardware-based base stations. Operation and maintenance module 120 may do this by issuing commands to the relevant supervisor modules 130.

In step 765, S1-Conn 110 executes instructions to remove the terminated internal eNodeB identifiers and corresponding cell IDs from its memory. Subprocess 702 then proceeds to step 735. In step 735, S1-Conn 110 issues a new PWS-RestartIndication with the revised list of Cell IDs (minus the Cell IDs corresponding to the terminated internal eNodeBs 125).

The ability of the S1-Conn 110 to intercept, re-map information within, repackage, and transmit messages between the internal eNodeBs 125 and the MMEs 150 enables other capabilities. For example, S1-Conn 110 may identify patterns in messages from the internal eNodeBs and derive position information from one or more of the UEs 170 connected to them.

Figure 8:
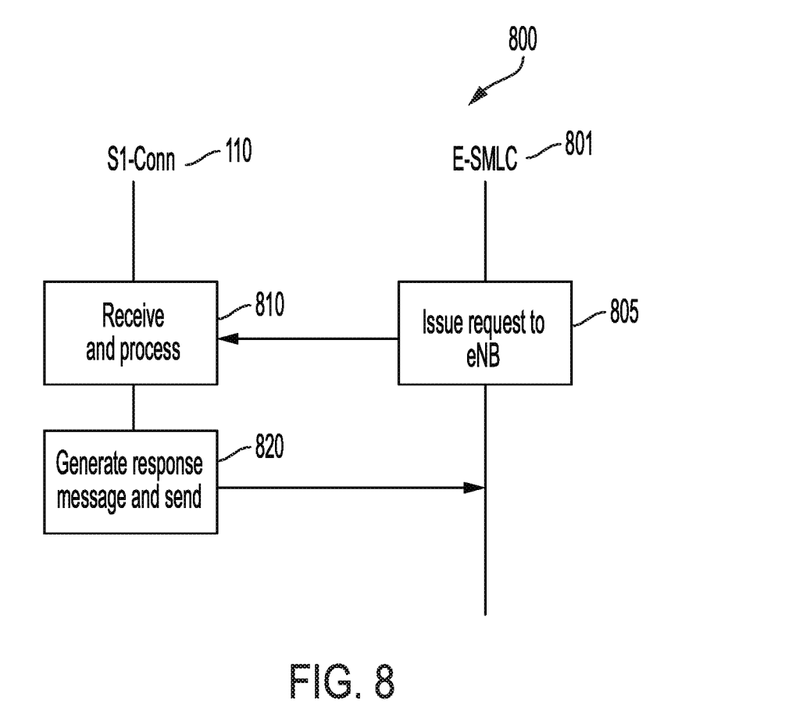
FIG. 8 illustrates an exemplary process by which the private subnetwork interacts with a positioning system, such as that implemented according to the LTE Positioning Protocol annex (LPPa).

FIG. 8 illustrates two exemplary processes 800 by which S1-Conn 110 handles position-related information in accordance with the LTE Positioning Protocol Annex (LPPa) between an E-SMLC (Evolved Serving Mobile Location Center) 801 and an internal eNodeB 125 and a UE 170, respectively. The E-SMLC 801 may be coupled to subnetwork 100 via one of the MMEs 150. The connection between MME 150 and E-SMLC 801 may be over an SLs interface, as specified in 3GPP TS 23.271. Details regarding LPPa may be found in 3GPP TS 36.455.

Through process 800, the E-SMLC 801 interacts with eNodeB in accordance with LPPa procedures, with the exception of the intervention of the S1-Conn 110, which as described above, makes the E-SMLC function as though it is interacting with a single "giant" eNodeB that is actually the S1-Conn 110 acting as a proxy for the internal eNodeBs 125 within subnetwork 100.

In step 805, E-SMLC 801 issues a request/command to the eNodeB emulated by S1-Conn 110. In this case, the E-SMLC 801 is not aware of the internal eNodeBs 125 of subnetwork 100, and only interacts with the S1-Conn 110. The request/command may include, for example, E-CID (Enhanced Cell ID) MEASUREMENT INITIATION REQUEST, E-CID MEASUREMENT TERMINATION COMMAND, OTDOA (Observed Time Difference of Arrival) INFORMATION REQUEST, etc. Note that in these interactions, S1-Conn 110 will report a predetermined location that may or may not be the actual location of the instantiation of S1-Conn 110. For example, if subnetwork 100 is deployed in a venue such as a stadium or an airport, the position reported by S1-Conn 100 may be the location of the venue's security office, or its main entrance, etc. Alternatively, S1-Conn 110 may return a list of locations, one for each cell 135 within subnetwork 100.

In step 810, S1-Conn 110 receives and processes the request/command, and in step 820, the S1-Conn 110 packages a response and transmits it to the E-SMLC 801.

Figure 9:
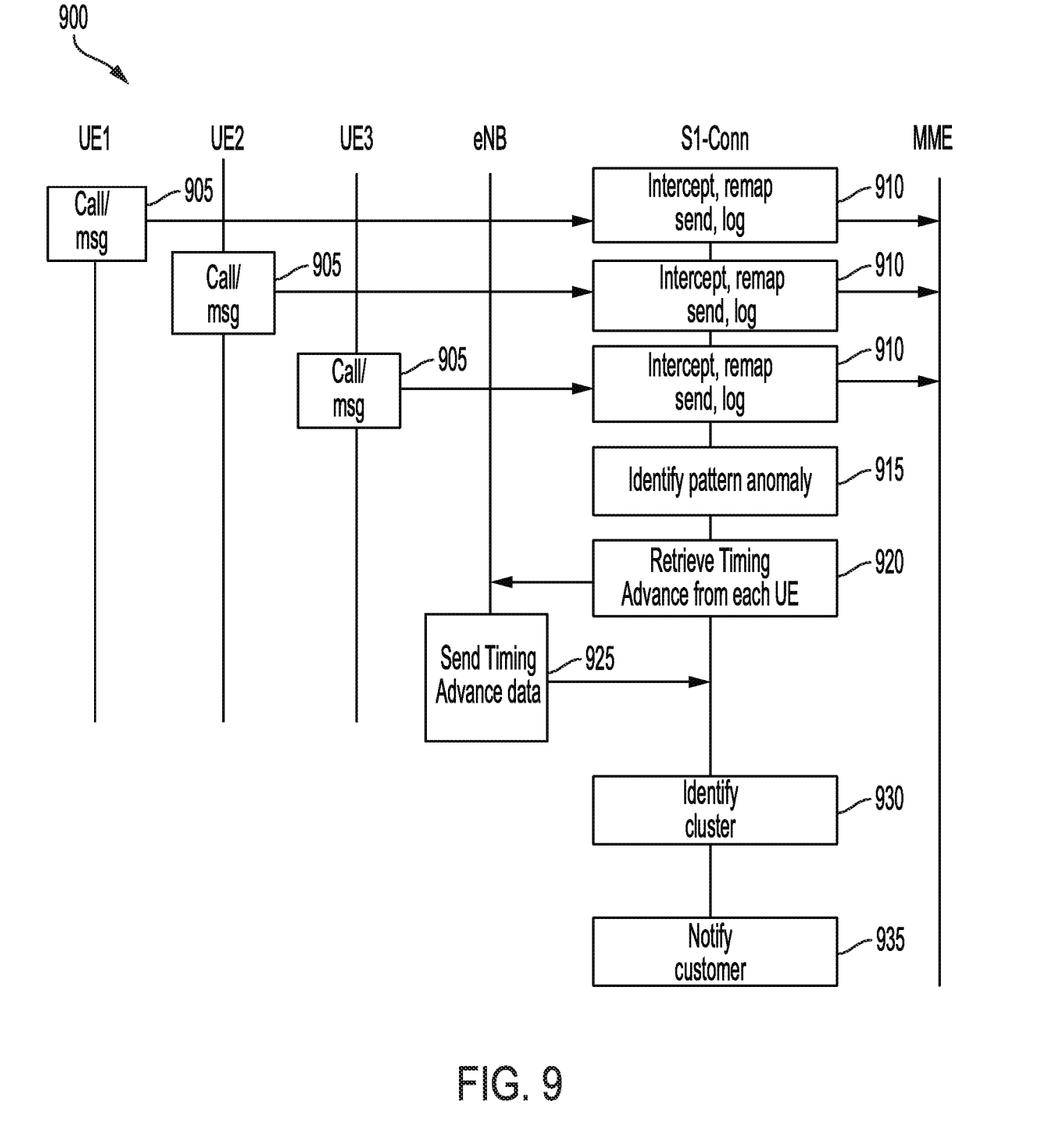
FIG. 9 illustrates an exemplary process by which the private subnetwork may identify patterns of call establishment messages to identify possible emergencies and notify venue security personnel.

FIG. 9 illustrates an exemplary process 900 by which S1-Conn 110 may selectively intercept requests from multiple UEs 170 connecting to one or more eNodeBs 125 of subnetwork 100 and take actions to intervene and notify relevant people/entities related to the venue of anomalous behavior among connected or connecting UEs 170.

In step 905, a plurality of UEs 170 issue messages to initiate a call, either by VoIP or CS fallback to a 3G/2G cell (not shown). These calls may be initiated via one internal eNodeB 125, or two or more neighboring internal eNodeBs 125.

In step 910, S1-Conn 110 intercepts the call initiation messages. In the case of VoIP, the S1-Conn 110 retrieves the QCI (QoS Class Identifier) from each message. If the QCI is equal to 1, the bearer to be established is identified as corresponding to a voice call. Alternatively, if the QCI is equal to 5, then the message corresponds to IMS (IP Multimedia Subsystem) signaling used to establish and release a VoIP connection. As with any message, S1-Conn 110 remaps the eNodeB cell ID with its virtual subnetwork baseband processor identifier, repackages the message, and transmits it to the intended MME 150. With each recognized VoIP call initiation, S1-Conn 110 may execute instructions to log relevant information corresponding to the call initiation (e.g., UE identifier, internal eNodeB identifier, 28 bit cell identifier (ECGI), S-TMSI (SAE-Temporary Mobile Subscriber Identity), time of receipt of message, etc.).

In step 915, S1-Conn 110 stores information related to call establishment events in step 910. Further to step 915, S1-Conn 110 may execute instructions to identify patterns, including history of call patterns, as a function of time. If, in the course of executing these instructions, S1-Conn 110 might identify an anomaly in call establishment, such as a sudden surge in call establishment messages from UEs 170 connected to a given internal cell 135, or multiple adjacent cells 135 of a single eNodeB 125, or an isolated instance of numerous UEs 170 within a single cell 135 simultaneously initiating calls. As used herein, simultaneously may imply events within a single narrow time window, such as within 1 second, 5 seconds, etc., at the location(s) corresponding to the antenna(s) of relevant cell(s) 135. In this case, S1-Conn 110 may store a plurality of identifiers, each corresponding to a UE 170 identified within the cluster.

In step 920, the S1-Conn 110 may command the relevant internal eNodeBs 125 to provide the most recent Timing Advance values corresponding to each UE identified in step 915. Subsequently, in step 925, the relevant internal eNodeBs 125 may provide the requested Timing Advance information corresponding to each UE 170 identified in step 915.

In step 930, once the S1-Conn 110 has received these values, it may execute instructions to determine if the Timing Advance values are sufficiently clustered to indicate whether the call establishment procedures executed by the relevant UEs may be in response to an event in their common location. It will be understood that, in doing so, S1-Conn 110 may execute instructions corresponding to one or more known clustering algorithms. If the clustering calculated in step 920 indicates a possible event, S1-Conn 110 may transmit instructions to neighboring internal eNodeBs 125 to determine Timing Advance values for each of the relevant UEs 170 and provide them to the S1-Conn 110. S1-Conn 110 may then determine the position of the cluster of UEs 170 based on triangulation.

In step 935, if S1-Conn 110 identifies a clustering of Timing Advance values for the relevant UEs 170 (regardless of whether it executes instructions to determine a cluster position via triangulation), S1-Conn 110 may execute instructions to send a message to a predetermined entity within the venue of subnetwork 100. An example of a predetermined entity may include a customer office, such as a security office.

What is claimed is:

1. A telecommunications system, comprising:
   a plurality of internal baseband processors; and
   a connection aggregator operatively coupled to the plurality of internal baseband processors, wherein the connection aggregator maintains a plurality of internal identifiers, each corresponding to one of the plurality of internal baseband processors,
   wherein the connection aggregator is configured to:
      intercept a first outbound message from a first one of the plurality of internal baseband processors and intercept a second outbound message from a second one of the plurality of internal base band processors,
      replace the internal identifier of the first internal baseband processor within the first outbound message with a virtual subnetwork baseband processor identifier common to the plurality of internal baseband processors and replace the internal identifier of the second internal baseband processor within the second outbound message with the same virtual subnetwork baseband processor identifier, and
      transmit the first modified outbound message to a Mobility Management Entity (MME) and transmit the second modified outbound message to an MME,
   wherein the connection aggregator is further configured to:
      intercept a first inbound message from an MME to a first destination internal baseband processor and intercept a second inbound message from an MME to a second destination internal baseband processor, wherein each of the first and the second destination internal baseband processors is one of the plurality of internal baseband processors,
      replace the virtual subnetwork baseband processor identifier common to the plurality of internal baseband processors within the first inbound message with the internal identifier of the first destination internal baseband processor to create a first modified inbound message and replace the virtual subnetwork baseband processor identifier common to the plurality of internal baseband processors within the second inbound message with the internal identifier of the second destination internal baseband processor to create a second modified inbound message, and
      transmit the first modified inbound message to the first destination internal baseband processor and transmit the second modified inbound message to the second destination internal baseband processor.

2. The telecommunication system of claim 1, wherein each of the plurality of internal baseband processors comprises an internal eNodeB.

3. The telecommunication system of claim 2, wherein each internal eNodeB associated with a corresponding one of the plurality of internal baseband processors comprises a virtual eNodeB.

4. The telecommunication system of claim 3, wherein the virtual eNodeB comprises a supervisor module.

5. The telecommunication system of claim 4, further comprising an operations and maintenance module that is coupled to each of the supervisor modules.

6. The telecommunication system of claim 1,
wherein the internal identifier for a given one of the plurality of baseband processors comprises an identifier common to all of the baseband processors and an identifier corresponding to a cell with which the given baseband processor is associated, and
wherein each of the plurality of baseband processors is associated with one or more cells.

7. The telecommunication system of claim 6, wherein the virtual subnetwork baseband processor identifier comprises a number of bits that are the same as the bits of the identifier that is common to all of the baseband processors.

8. A method for establishing a connection between a source internal baseband processor and a target internal baseband processor within a telecommunication subnetwork, comprising:
generating a source internal baseband processor identifier;
generating a target internal baseband processor identifier;
generating a source configuration transfer message, the source configuration transfer message including the source internal baseband processor identifier and the target internal baseband processor identifier;
transmitting the source configuration transfer message to a mobility management entity;
intercepting the source configuration transfer message to the mobility management entity;
extracting the source internal baseband processor identifier and the target internal baseband identifier from the source configuration transfer message;
generating a target configuration transfer message, the target configuration transfer message including the source internal baseband processor identifier and the target internal baseband processor identifier; and
transmitting the target configuration transfer message to the target internal baseband processor.

9. The method of claim 8, wherein the source configuration transfer message comprises an eNB Configuration Transfer message.

10. The method of claim 8, wherein the target configuration transfer message comprises an MIME Configuration Transfer message.

11. The method of claim 8, wherein the generating a source internal baseband processor identifier comprises generating a 28 bit internal identifier, wherein the 28 bit internal identifier comprises a 20 bit eNodeB identifier and an 8 bit identifier of a cell corresponding to the source internal baseband processor.

12. The method of claim 8, wherein the generating a target internal baseband processor identifier comprises retrieving a 28 bit cell identifier from a measurement report.

* * * * *